(12) United States Patent
Dotan et al.

(10) Patent No.: US 9,225,700 B1
(45) Date of Patent: *Dec. 29, 2015

(54) PROXIMITY-BASED AUTHENTICATION

(71) Applicant: EMC Corporation, Hopkinton, MA (US)

(72) Inventors: Yedidya Dotan, Newton, MA (US); Lawrence N. Friedman, Arlington, MA (US); Karl Kowalski, Arlington, MA (US); Piers Bowness, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/837,675

(22) Filed: Mar. 15, 2013

(51) Int. Cl.
*H04L 29/06* (2006.01)
*H04W 4/02* (2009.01)

(52) U.S. Cl.
CPC .............. *H04L 63/08* (2013.01); *H04L 63/107* (2013.01); *H04L 63/0492* (2013.01); *H04W 4/023* (2013.01)

(58) Field of Classification Search
None
See application file for complete search history.

(56) References Cited

U.S. PATENT DOCUMENTS

| 7,839,814 | B2 | 11/2010 | Narasimha et al. | |
|---|---|---|---|---|
| 8,554,912 | B1 | 10/2013 | Reeves et al. | |
| 2005/0243936 | A1* | 11/2005 | Agrawala et al. | 375/259 |
| 2006/0143717 | A1 | 6/2006 | Ransome et al. | |
| 2007/0024698 | A1* | 2/2007 | Engstrom et al. | 348/14.01 |
| 2009/0037581 | A1* | 2/2009 | Richardson et al. | 709/224 |
| 2010/0317323 | A1* | 12/2010 | Facemire et al. | 455/411 |
| 2011/0244841 | A1* | 10/2011 | Locker et al. | 455/417 |
| 2012/0083286 | A1* | 4/2012 | Kim et al. | 455/456.1 |
| 2012/0200457 | A1* | 8/2012 | Farrokhi et al. | 342/357.29 |
| 2013/0005352 | A1* | 1/2013 | Jones et al. | 455/456.1 |

OTHER PUBLICATIONS

Dotan, et al., Biometric Authenication With Smart Mobile Device, U.S. Appl. No. 13/341,160, filed Dec. 30, 2011.
Friedman, et al., Device Presence Validation, U.S. Appl. No. 13/630,388, filed Sep. 28, 2012.
Faibish, et al., Controlling Access to a Protected Resource Using Multiple User Devices, U.S. Appl. No. 13/729,996, filed Dec. 28, 2012.

* cited by examiner

*Primary Examiner* — Harunur Rashid
*Assistant Examiner* — Andrew Steinle
(74) *Attorney, Agent, or Firm* — BainwoodHuang

(57) ABSTRACT

A method performed by a client access device includes (1) receiving, at the client access device, a signal from a client authorizing device, the signal including an environmental detection instruction, the environmental detection instruction instructing the client access device to detect an aspect of a local environment, (2) detecting, at the client access device, the aspect of the environment indicated by the environmental detection instruction to yield a first environmental detection result, (3) sending the first environmental detection result from the client access device to a remote server, and (4) in response to sending the environmental detection result to the remote server, receiving a proximity signal from the remote server indicating whether or not proximity between the client access device and the client authorizing device has been established by comparing the first environmental detection result to a second environmental detection result sent from the client authorizing device to the server.

21 Claims, 4 Drawing Sheets

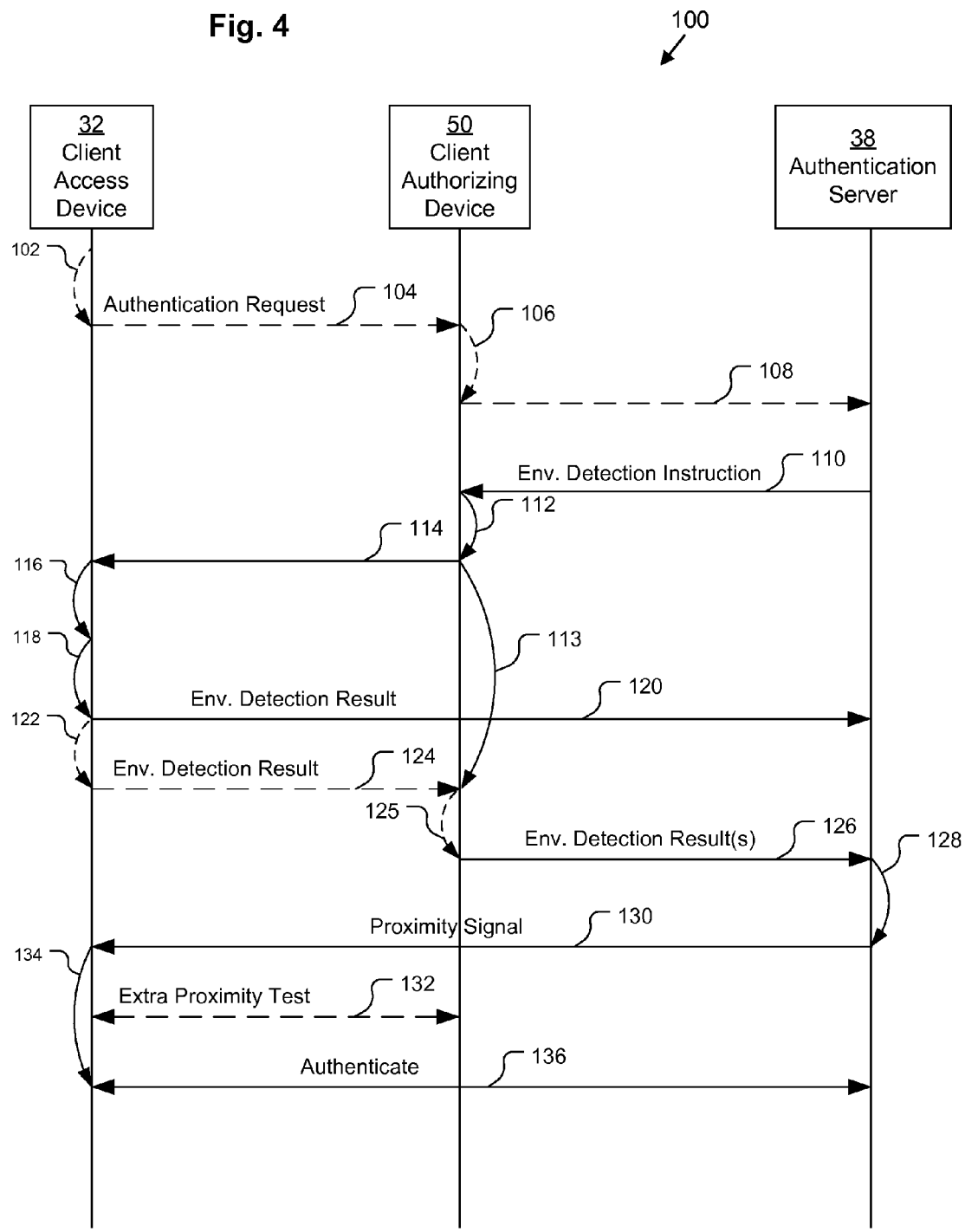

PROXIMITY-BASED AUTHENTICATION

BACKGROUND

When a user wishes to access a protected resource, he is typically required to authenticate his identity and acquire permission to access that resource. In some systems, this is accomplished by the user proving that he is in possession of an authorizing device such as a token or a cell phone. In order to use a token, the user may enter a temporary token code displayed on the screen of the token to prove that he is in possession of the token or the user may physically attach the token to his computer. To use a cell phone for authentication, when the user attempts to access a protected resource, an authentication server may send an out-of-band message to the user's cell phone and the user may then enter information from that message into his computer proving possession of the cell phone.

SUMMARY

The above-described conventional techniques for proving possession of an authorizing device are not entirely optimal. For example, tokens can be hacked and they are not widely deployed in consumer contexts. In addition, requiring a user to type in information read from a cell phone or other device is cumbersome Thus, it would be desirable to establish possession of an authorizing device using widely deployed equipment and not requiring users to type in information read from a screen. Thus, an improved technique is provided for allowing a user to establish possession of an authorizing device by establishing environmental proximity to the authorizing device using sensory features commonly found in user devices, such as cameras.

One embodiment is directed to a method performed by a client access device. The method includes (1) receiving, at the client access device, a signal from a client authorizing device, the signal including an environmental detection instruction, the environmental detection instruction instructing the client access device to detect an aspect of a local environment, (2) detecting, at the client access device, the aspect of the environment indicated by the environmental detection instruction to yield a first environmental detection result, (3) sending the first environmental detection result from the client access device to a remote server, and (4) in response to sending the environmental detection result to the remote server, receiving a proximity signal from the remote server indicating whether or not proximity between the client access device and the client authorizing device has been established by comparing the first environmental detection result to a second environmental detection result sent from the client authorizing device to the server. In some embodiments, signals are exchanged between the client access device and the client authorizing device using cameras and display screens. Other embodiments are directed to a computerized apparatus and a computer program product for performing a method similar to that described above.

Another embodiment is directed to a method performed by a client authorizing device. The method includes (a) receiving, at the client authorizing device, a first signal from a client access device, the first signal including an authentication request, (b) forwarding the received authentication request from the client authorizing device to a remote server, (c) in response to forwarding, receiving an environmental detection instruction from the remote server at the client authorizing device, the environmental detection instruction instructing the client access device to detect an aspect of a local environment, (d) sending a second signal from the client authorizing device to the client access device, the second signal including the environmental detection instruction, (e) detecting, at the client authorizing device, the aspect of the environment indicated by the environmental detection instruction to yield a first environmental detection result, and (f) sending the first environmental detection result from the client authorizing device to the remote server to allow the remote server to generate a proximity signal indicating whether or not proximity between the client access device and the client authorizing device has been established by comparing the first environmental detection result to a second environmental detection result sent from the client access device to the server. In some embodiments, signals are exchanged between the client access device and the client authorizing device using cameras and display screens. Other embodiments are directed to a computerized apparatus and a computer program product for performing a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 depicts an example method according to various embodiments.

DETAILED DESCRIPTION

Embodiments are directed to techniques for allowing a user to establish possession of an authorizing device by establishing environmental proximity to the authorizing device using sensory features commonly found in user devices, such as cameras.

Figure 1:
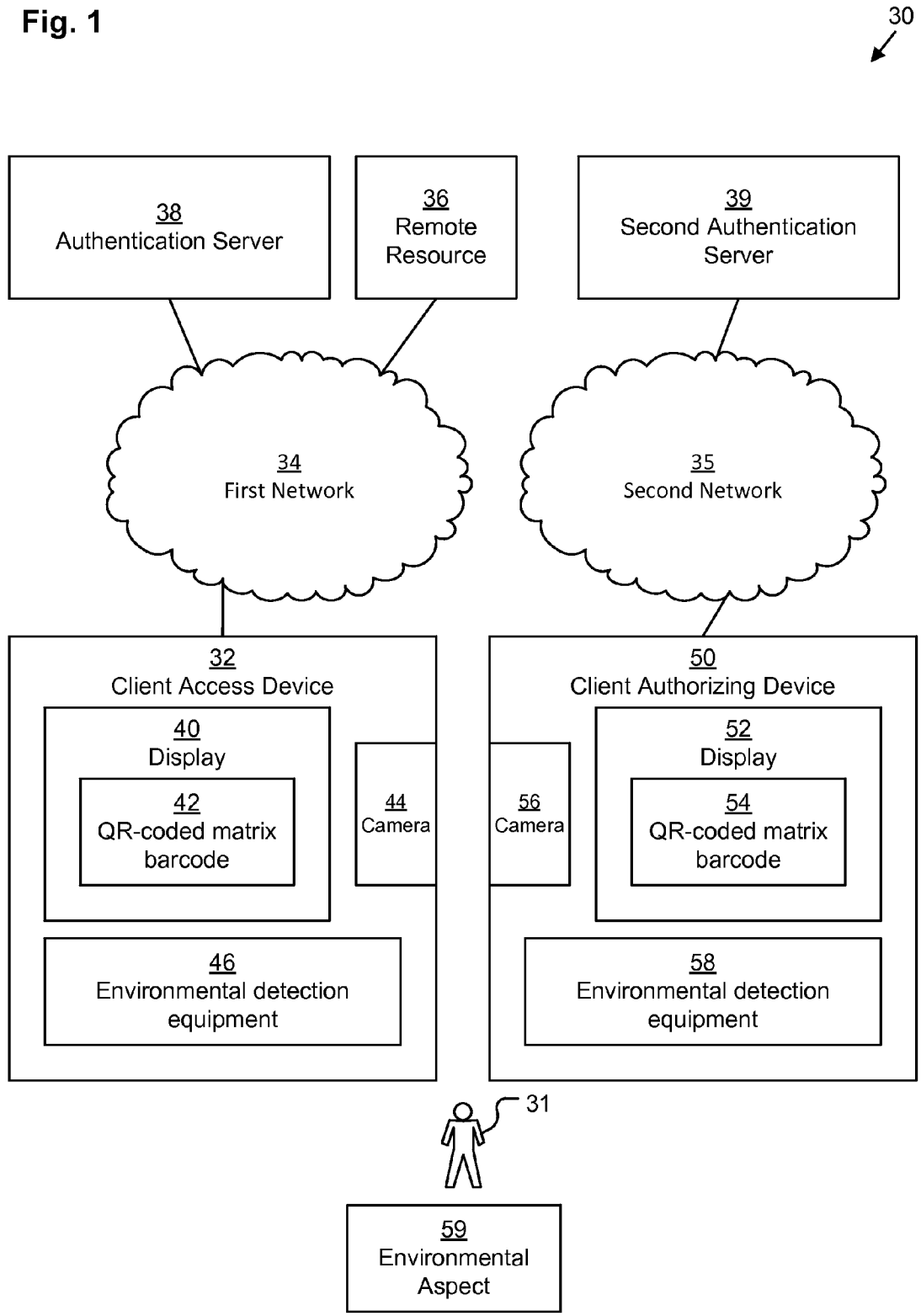
FIG. 1 depicts an example system for use in practicing various embodiments.

FIG. 1 depicts an example system 30. System 30 includes a user 31 operating a client access device 32 in order to attempt to gain access to a protected remote resource 36 over a first network 34. Client access device 32 may be any kind of computing device, such as, for example, a personal computer, a workstation, a server, an enterprise server, a laptop computer, a mobile computer, a smart phone, a tablet computer, etc. Client access device 32 includes a display screen 40 capable of displaying an encoded image such as, for example, a QR-coded matrix barcode 42. Client access device 32 also includes a camera 44 as well as environmental detection equipment 46, such as, for example, a microphone, a wireless transceiver, a radio receiver, etc.

Network 34 may be any kind of network, such as, for example, a local area network, a wide area network, the Internet, a storage area network, a fabric of interconnected hubs and switches, a cellular network, etc. In some embodiments, in lieu of a network, direct point-to-point connections may be used.

In operation, when the user 31 wishes to access the resource 36, the user 31 is required to prove possession of a client authorizing device 50 co-located in proximity to the client access device 32. Client authorizing device 50 may be any kind of computing device, such as, for example, a personal computer, a workstation, a server, an enterprise server, a laptop computer, a mobile computer, a smart phone, a tablet computer, etc., however, the client authorizing device 50 is typically a mobile device of some sort, such as a smart phone, tablet, or laptop. Client authorizing device 50 includes a display screen 52 capable of displaying an encoded image such as, for example, a QR-coded matrix barcode 54. Client authorizing device 50 also includes a camera 56 as well as environmental detection equipment 58, such as, for example, a microphone, a wireless transceiver, a radio receiver, etc. The user 31 is then able to operate the client access device 32 and the client authorizing device 50 so that the environmental detection equipment 46, 58 on both devices is able to detect a particular environmental aspect 59 indicative of proximity. The user 31 is also able to operate the client access device 32 and the client authorizing device 50 so that information regarding this process is exchanged between the devices using encoded images (e.g., QR-coded matrix barcodes 42, 54) displayed on the displays 40, 52 and then relayed to an authentication server 38 across first network 34. In some embodiments, client authorizing device connects to a second authentication server 39 across second network 35.

Figure 2:
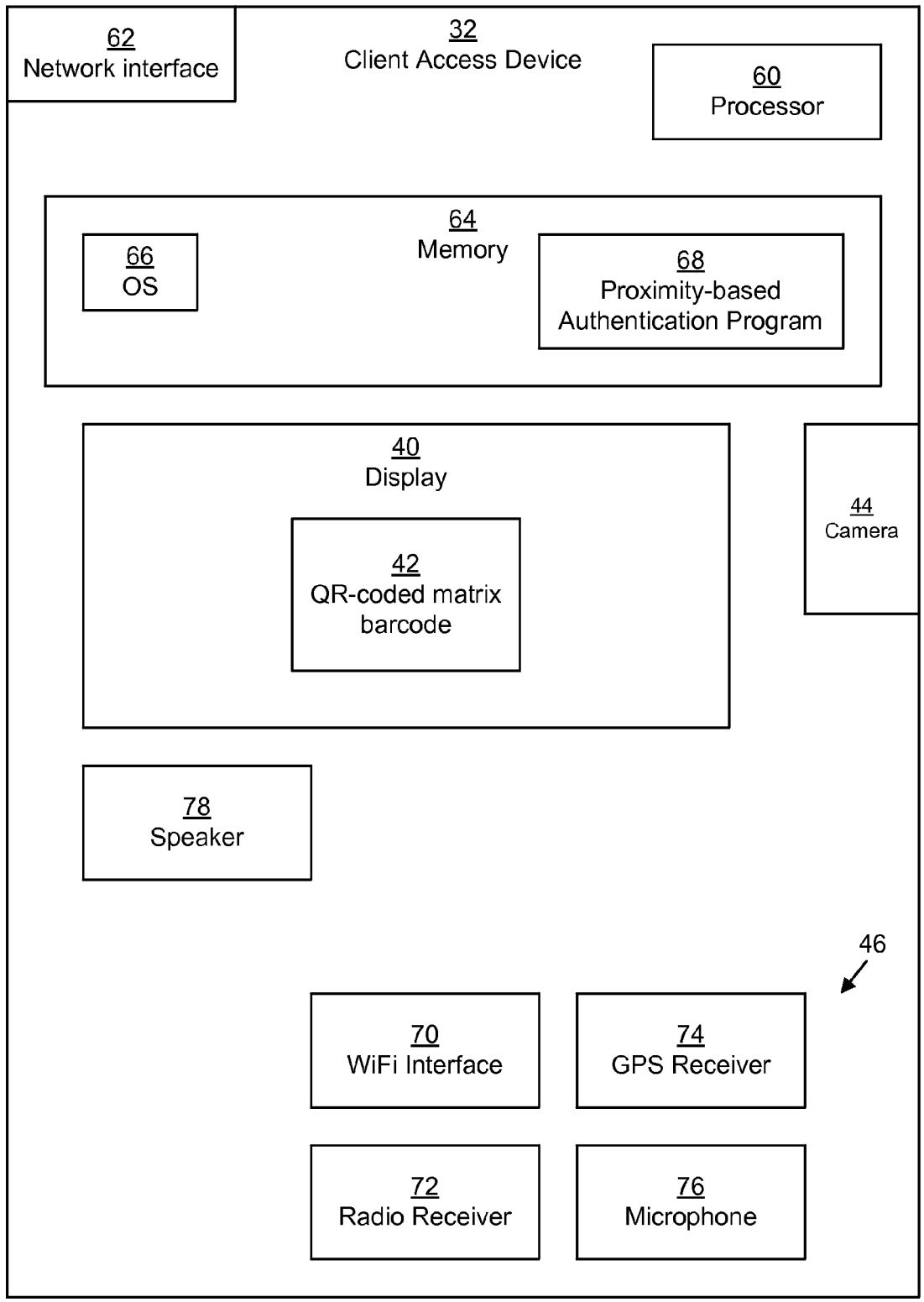
FIG. 2 depicts an example apparatus according to various embodiments.

FIG. 2 depicts an example client access device 32. Client access device 32 includes a processor 60. Processor 60 may be any kind of processor or set of processors configured to perform operations, such as, for example, a microprocessor, a multi-core microprocessor, a digital signal processor, a collection of electronic circuits, or any combination of the above. Client access device 32 also includes a network interface 62 for interfacing with network 34.

Client access device 32 also includes memory 64. Memory 64 may be any kind of digital system memory, such as, for example, RAM. Memory 64 stores programs executing on processor 60 as well as data used by those programs. Memory 64 stores an operating system (OS) 66 and a proximity-based authentication program 68, both of which run on processor 60. Memory 64 may include both a system memory portion for storing programs and data in active use by the processor 60 as well as a persistent storage portion (e.g., solid-state storage and/or disk-based storage) for storing programs and data even while the client access device 32 is powered off. OS 66 and proximity-based authentication program 68 are typically stored both in system memory and in persistent storage so that they may be loaded into system memory from persistent storage upon a system restart. Proximity-based authentication program 68, when stored in non-transient form either in system memory or in persistent storage, forms a computer program product. The processor 60 running the proximity-based authentication program 68 thus forms a specialized circuit constructed and arranged to carry out the various processes described herein.

As previously mentioned, client access device 32 also includes a display 40, a camera 44, and environmental detection equipment 46. Environmental detection equipment 46 may include one or more of the following, a WiFi (or other wireless network) interface 70, a radio receiver 72 capable of receiving broadcast radio stations such as AM-band and FM-band radio stations, a Global Positioning System (GPS) receiver 74 capable of communicating with GPS satellites to establish location, and a microphone 76. Camera 44 may also be thought of being part of the environmental detection equipment 46 in certain embodiments. In some embodiments, client access device 32 also includes a speaker (or loudspeaker) 78 capable of producing sounds.

Figure 3:
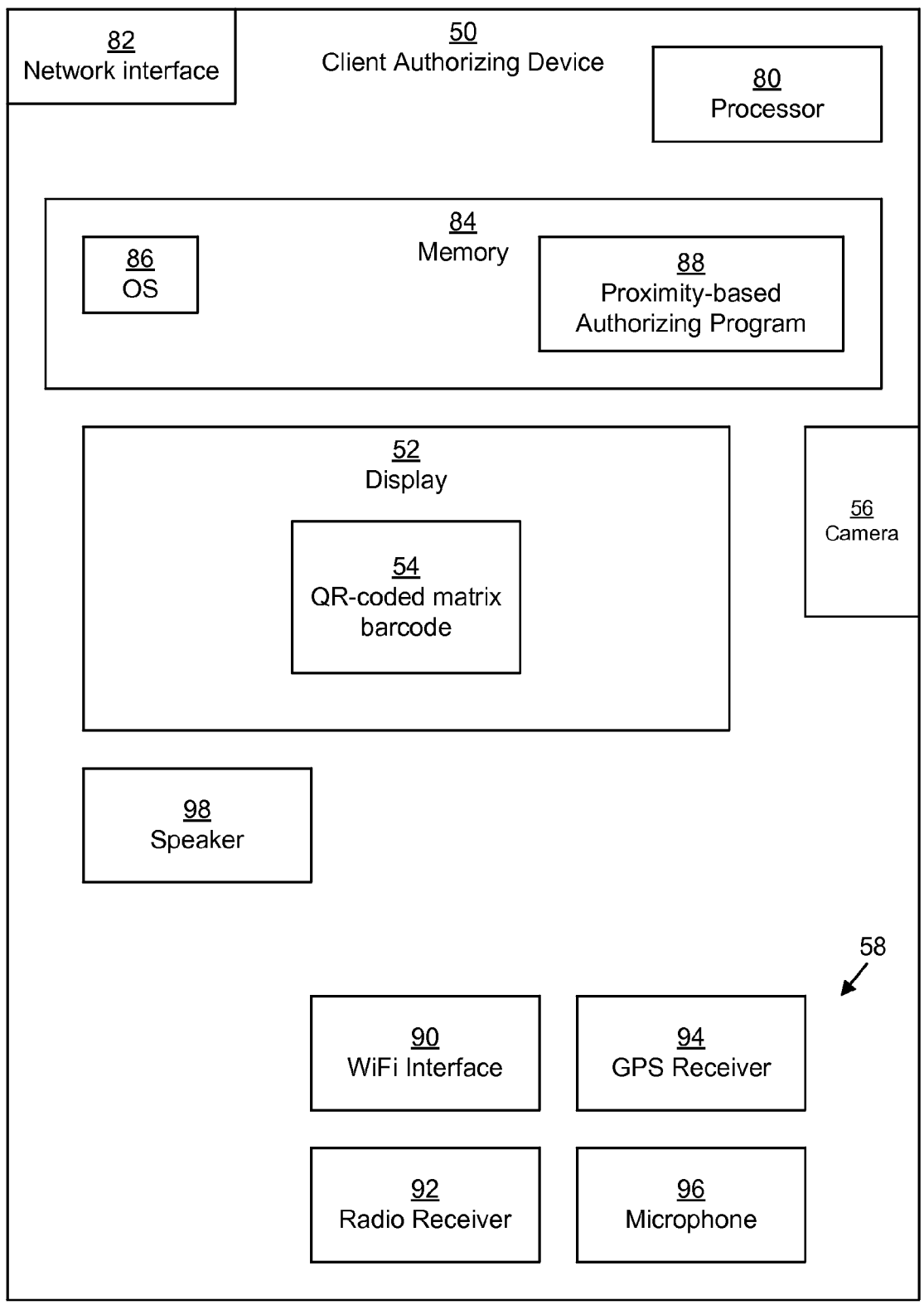
FIG. 3 depicts an example apparatus according to various embodiments.

FIG. 3 depicts an example client authorizing device 50. Client authorizing device 50 includes a processor 80. Processor 80 may be any kind of processor or set of processors configured to perform operations, such as, for example, a microprocessor, a multi-core microprocessor, a digital signal processor, a collection of electronic circuits, or any combination of the above. Client authorizing device 50 also includes a network interface 82 for interfacing with network 34 or network 35.

Client authorizing device 50 also includes memory 84. Memory 84 may be any kind of digital system memory, such as, for example, RAM. Memory 84 stores programs executing on processor 80 as well as data used by those programs. Memory 84 stores an operating system (OS) 86 and a proximity-based authorizing program 88, both of which run on processor 80. Memory 84 may include both a system memory portion for storing programs and data in active use by the processor 80 as well as a persistent storage portion (e.g., solid-state storage and/or disk-based storage) for storing programs and data even while the client authorizing device 50 is powered off. OS 86 and proximity-based authorizing program 88 are typically stored both in system memory and in persistent storage so that they may be loaded into system memory from persistent storage upon a system restart. Proximity-based authorizing program 88, when stored in non-transient form either in system memory or in persistent storage, forms a computer program product. The processor 80 running the proximity-based authorizing program 88 thus forms a specialized circuit constructed and arranged to carry out the various processes described herein.

As previously mentioned, client authorizing device 50 also includes a display 52, a camera 56, and environmental detection equipment 58. Environmental detection equipment 58 may include one or more of the following, a WiFi (or other wireless network) interface 90, a radio receiver 92 capable of receiving broadcast radio stations such as AM-band and FM-band radio stations, a GPS receiver 94 capable of communicating with GPS satellites to establish location, and a microphone 76. Camera 56 may also be thought of being part of the environmental detection equipment 58 in certain embodiments. In some embodiments, client authorizing device 50 also includes a speaker (or loudspeaker) 98 capable of producing sounds.

FIG. 4 illustrates, as method 100, the operation of proximity-based authentication program 68 and proximity-based authorizing program 88 when used to authenticate to authentication server 38 (and, in some embodiments, second authentication server 39. It should be understood that any time a piece of software, such as, for example, proximity-based authentication program 68 or proximity-based authorizing program 88, is described as performing a method, process, step, or function, in actuality what is meant is that a computing device (e.g., client access device 32 or client authorizing device 50) on which that piece of software is running performs the method, process, step, or function when executing that piece of software on its processor (e.g., processor 60, 80). It should also be understood that, in some embodiments, instead of processor 60, 80 executing code of proximity-based authentication program 68 or proximity-based authorizing program 88, specialized circuitry of the client access device 32 or client authorizing device 50 operates to perform the method, process, step, or function directly in hardware.

Steps 102-108 are optional.

In step 102, client access device 32 encodes an authentication request 104 in a matrix barcode 42, and then sends the encoded authentication request 104 to the client authorizing device 50 (e.g., by displaying the QR code 42 on display 40 in view of camera 56). In step 106, client authorizing device 50 receives and decodes the authentication request 104 by operating camera 56 to photograph QR code 42 on display 40 and then applying a QR decoding algorithm. Then, in step 108, client authorizing device 50 forwards the authentication request 104 to authentication server 38 over network 34 or 35. In some embodiments, client authorizing device 50 communicates with second authentication server 39 instead of authentication server 38.

In response, authentication server 38 sends an environmental detection instruction 110 to client authorizing device 50. Environmental detection instruction 110 includes an instruction indicating a particular environmental aspect 59 to detect.

For example, the particular environmental aspect 59 to detect may be the set of WiFi networks visible at the user's location. If the client access device 32 and the client authorizing device 50 are in close enough proximity, the set of WiFi networks visible to each device should be either the same or very close.

As an additional example, the particular environmental aspect 59 to detect may be the set of radio stations resolvable at the user's location. If the client access device 32 and the client authorizing device 50 are in close enough proximity and include similar radio receivers 72, 92, the set of radio stations resolvable at each device should be either the same or very close. The particular environmental aspect 59 may also include a signal strength of each resolvable radio station, which should also be the same or similar on both devices when in proximity.

As an additional example, the particular environmental aspect 59 to detect may be the set of GPS satellites detectable at the user's location. If the client access device 32 and the client authorizing device 50 are in close enough proximity and include similar GPS receivers 74, 94, the set of GPS satellites detectable at each device should be either the same or very close. The particular environmental aspect 59 may also include a signal strength of each detectable GPS satellites, which should also be the same or similar on both devices when in proximity.

As an additional example, the particular environmental aspect 59 to detect may be the background illumination (brightness) at the user's location. If the client access device 32 and the client authorizing device 50 are in close enough proximity, the background illumination detectable by the camera 44, 56 of each device should be either the same or very close in brightness.

As an additional example, the particular environmental aspect 59 to detect may be the face of the user 31 operating the client access device 32 and the client authorizing device 50 using camera 44, 56 of each device. The photograph taken by each camera 44, 56 may be processed using a facial recognition algorithm.

As an additional example, the particular environmental aspect 59 to detect may be the environmental noise at the user's location. If the client access device 32 and the client authorizing device 50 are in close enough proximity, the environmental noise detectable by the microphone 76, 96 of each device should be either the same or very close in overall loudness. In some situations, the environmental detection instruction 110 may include an instruction to process the environmental noise to identify a song playing in the background.

In step 112, client authorizing device 50 encodes the environmental detection instruction 110 in a matrix barcode 54, and then sends the encoded environmental detection instruction 114 to the client access device 32 (e.g., by displaying the QR code 54 on display 52 in view of camera 44).

In step 116, client access device 32 decodes the received encoded environmental detection instruction 114 to yield the environmental detection instruction 110. Then, in step 118, client access device 32 operates its local environmental detection equipment 46 to detect the particular environmental aspect 59, yielding an environmental detection result 120, which it sends to authentication server 38 over network 34. In some embodiments, client access device 32 also, in step 122, encodes the environmental detection result 120 in a matrix barcode 42 as encoded environmental detection result 124, and then sends the encoded environmental detection result 124 to the client authorizing device 50 (e.g., by displaying the QR code 42 on display 40 in view of camera 56).

In step 113, client authorizing device 50 operates its local environmental detection equipment 58 to detect the particular environmental aspect 59, yielding an environmental detection result 126, which it sends to authentication server 38 over network 34.

In embodiments in which client authorizing device 50 communicates with second authentication server 39, after performing step 113, client authorizing device 50 performs step 125 in which it decodes the received encoded environmental detection result 124. In these embodiments, instead of sending environmental detection result 126 to authentication server 38 over network 34, client authorizing device 50 sends both environmental detection result 120 and environmental detection result 126 to authentication server 39 over network 35.

In step 128, authentication server 38 compares the environmental detection result 120 from the client access device 32 with the environmental detection result 126 from the client authorizing device 50 and then generates a proximity signal 130. If the two are identical, the comparison succeeds. If they are not identical, but they are substantially similar (e.g., brightness levels are within a measurement tolerance of each other or the list of WiFi networks is 90% overlapping), the comparison also succeeds. Otherwise, the comparison fails. If the comparison succeeds, then proximity signal 130 indicates that proximity has been established. If the comparison fails, then proximity signal 130 indicates that proximity has not been established. In some embodiments, if the comparison technically fails but is actually inconclusive (e.g., the list of WiFi networks is 60% overlapping), the proximity signal 130 may indicate an inconclusive result as well.

In embodiments in which client authorizing device 50 communicates with second authentication server 39, step 128 is performed by the second authentication server 39 which received both environmental detection result 120 and environmental detection result 126 together from the client authorizing device 50.

In some embodiments, at this point, extra proximity testing 132 (e.g., a repeat of steps 102-130) may be performed for added certainty. Typically, the extra proximity testing 132 will test for a different environmental aspect 59 than originally. In some embodiments, extra proximity testing 132 is performed only if the proximity signal 130 indicates an inconclusive result.

Upon receiving a positive proximity signal 130 (and performing any extra proximity testing 132), client access device 32 is able to authenticate 136 with the authentication server 38 and access the resource 36.

Thus, techniques have been described for allowing a user 31 to establish possession of an authorizing device 50 by establishing environmental proximity to the authorizing device 50 using sensory features commonly found in user devices, such as cameras 44, 56.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a client access device, the method comprising:
    sending an authentication request from the client access device to a client authorizing device;
    in response to sending the authentication request, receiving, at the client access device, a signal from the client authorizing device, the signal including an environmental detection instruction, the environmental detection instruction instructing the client access device to detect an aspect of a local environment, the environmental detection instruction having been received from a remote server by the client authorizing device in response to the client authorizing device forwarding the authentication request to the remote server;
    detecting, at the client access device, the aspect of the environment indicated by the environmental detection instruction to yield a first environmental detection result;
    sending the first environmental detection result from the client access device to the remote server; and
    in response to sending the environmental detection result to the remote server, receiving, at the client access device, a proximity signal from the remote server indicating whether or not proximity between the client access device and the client authorizing device has been established by comparing the first environmental detection result to a second environmental detection result sent from the client authorizing device to the server.

2. The method of claim 1 wherein receiving the signal from the client authorizing device includes:
    operating a camera of the client access device to take a photograph of a screen of the client authorizing device, the screen of the client authorizing device displaying an image encoding the environmental detection instruction; and
    extracting the environmental detection instruction from the photograph.

3. The method of claim 2 wherein:
    the image encodes the environmental detection instruction using a matrix barcode; and
    extracting the environmental detection instruction from the photograph includes decoding the matrix barcode.

4. The method of claim 1 wherein detecting the aspect of the environment indicated by the environmental detection instruction includes detecting which wireless networks are locally discoverable using a wireless network interface.

5. The method of claim 1 wherein detecting the aspect of the environment indicated by the environmental detection instruction includes detecting which radio stations are locally resolvable using a radio receiver.

6. The method of claim 5 wherein detecting the aspect of the environment indicated by the environmental detection instruction further includes recording a signal strength associated with each locally resolvable radio station.

7. The method of claim 1 wherein
    detecting the aspect of the environment indicated by the environmental detection instruction includes detecting which Global Positioning System (GPS) satellites are locally detectable using a GPS receiver of the client access device, defining a first set; and
    the proximity signal received from the remote server indicates whether or not proximity between the client access device and the client authorizing device has been established by comparing the first set and the second set.

8. The method of claim 1 wherein detecting the aspect of the environment indicated by the environmental detection instruction includes detecting background illumination using a camera.

9. The method of claim 1 wherein detecting the aspect of the environment indicated by the environmental detection instruction includes detecting an overall loudness of environmental noise using a microphone of the client access device.

10. The method of claim 9 wherein detecting the aspect of the environment indicated by the environmental detection instruction includes:
    detecting environmental noise using a microphone of the client access device;
    processing the detected environmental noise to resolve a song being played by a loudspeaker of the client authorizing device; and
    recognizing the song with reference to a database of song information.

11. The method of claim 1 wherein detecting the aspect of the environment indicated by the environmental detection instruction includes operating a camera of the client access device to take a photograph of a person operating the client access device.

12. The method of claim 1 wherein the method further comprises sending the first environmental detection result from the client access device to the client authorizing device.

13. The method of claim 12 wherein:
    sending the first environmental detection result from the client access device to the remote server includes sending the first environmental detection result across a first network channel; and
    the client authorizing device is configured to:
        detect the aspect of the local environment to yield the second environmental detection result; and
        send the first environmental detection result and the second environmental detection result to the remote server across a second network channel, the second network channel being distinct from the first network channel.

14. The method of claim 1 wherein, the method further comprises, in response to receiving a proximity signal from the remote server indicating that proximity between the client access device and the client authorizing device has been established, authenticating to the remote server.

15. The method of claim 1 wherein, the method further comprises, in response to receiving a proximity signal from the remote server indicating that proximity between the client access device and the client authorizing device has been established, performing a proximity detection technique to verify the proximity between the client access device and the client authorizing device to the remote server prior to authenticating to the remote server.

16. The method of claim 1 wherein sending the authentication request to the client authorizing device includes displaying a matrix barcode on a display of the client access device which encodes the authentication request while the display of the client access device is within view of a camera of the client authorizing device.

17. A method performed by a client authorizing device, the method comprising:
   receiving, at the client authorizing device, a first signal from a client access device, the first signal including an authentication request;
   forwarding the received authentication request from the client authorizing device to a remote server;
   in response to forwarding, receiving an environmental detection instruction from the remote server at the client authorizing device, the environmental detection instruction instructing the client access device to detect an aspect of a local physical environment external to the client access device;
   sending a second signal from the client authorizing device to the client access device, the second signal including the environmental detection instruction;
   detecting, at the client authorizing device, the aspect of the local physical environment indicated by the environmental detection instruction to yield a first environmental detection result; and
   sending the first environmental detection result from the client authorizing device to the remote server to allow the remote server to generate a proximity signal indicating whether or not proximity between the client access device and the client authorizing device has been established by comparing the first environmental detection result to a second environmental detection result sent from the client access device to the remote server.

18. The method of claim 8 wherein background illumination using the camera includes detecting an overall brightness of the background illumination, the camera being of the client access device.

19. The method of claim 1 wherein the method further comprises:

receiving, at the client access device, another environmental detection instruction from the client authorizing device, the other environmental detection instruction instructing the client access device to detect another different aspect of the local environment in response to an inconclusive proximity determination made by the remote server using the first environmental detection result and the second environmental detection result;
detecting, at the client access device, the other different aspect of the environment indicated by the other environmental detection instruction to yield a third environmental detection result;
sending the third environmental detection result from the client access device to the remote server; and
in response to sending the other environmental detection result to the remote server, receiving another proximity signal from the remote server indicating whether or not proximity between the client access device and the client authorizing device has been established by comparing the third environmental detection result to a fourth environmental detection result sent from the client authorizing device to the server.

20. The method of claim 1 wherein the method further comprises, in response to receiving the proximity signal, the client access device authenticating to the remote server in order to be able to access a remote resource.

21. The method of claim 17 wherein the method further comprises:
   in response to sending the first environmental detection result from the client authorizing device to the remote server and in response to the remote server generating an inconclusive proximity signal using the first environmental detection result and the second environmental detection result, receiving another environmental detection instruction from the remote server at the client authorizing device, the other environmental detection instruction instructing the client access device to detect another different aspect of the local physical environment external to the client access device;
   sending a third signal from the client authorizing device to the client access device, the third signal including the other environmental detection instruction;
   detecting, at the client authorizing device, the other different aspect of the local physical environment indicated by the other environmental detection instruction to yield a third environmental detection result; and
   sending the third environmental detection result from the client authorizing device to the remote server to allow the remote server to generate another proximity signal indicating whether or not proximity between the client access device and the client authorizing device has been established by comparing the third environmental detection result to a fourth environmental detection result sent from the client access device to the remote server.

* * * * *